BEST AVAILABLE COPY
J. Turner.
Churn.
No. 9003-X Patented Aug. 15, 1835.
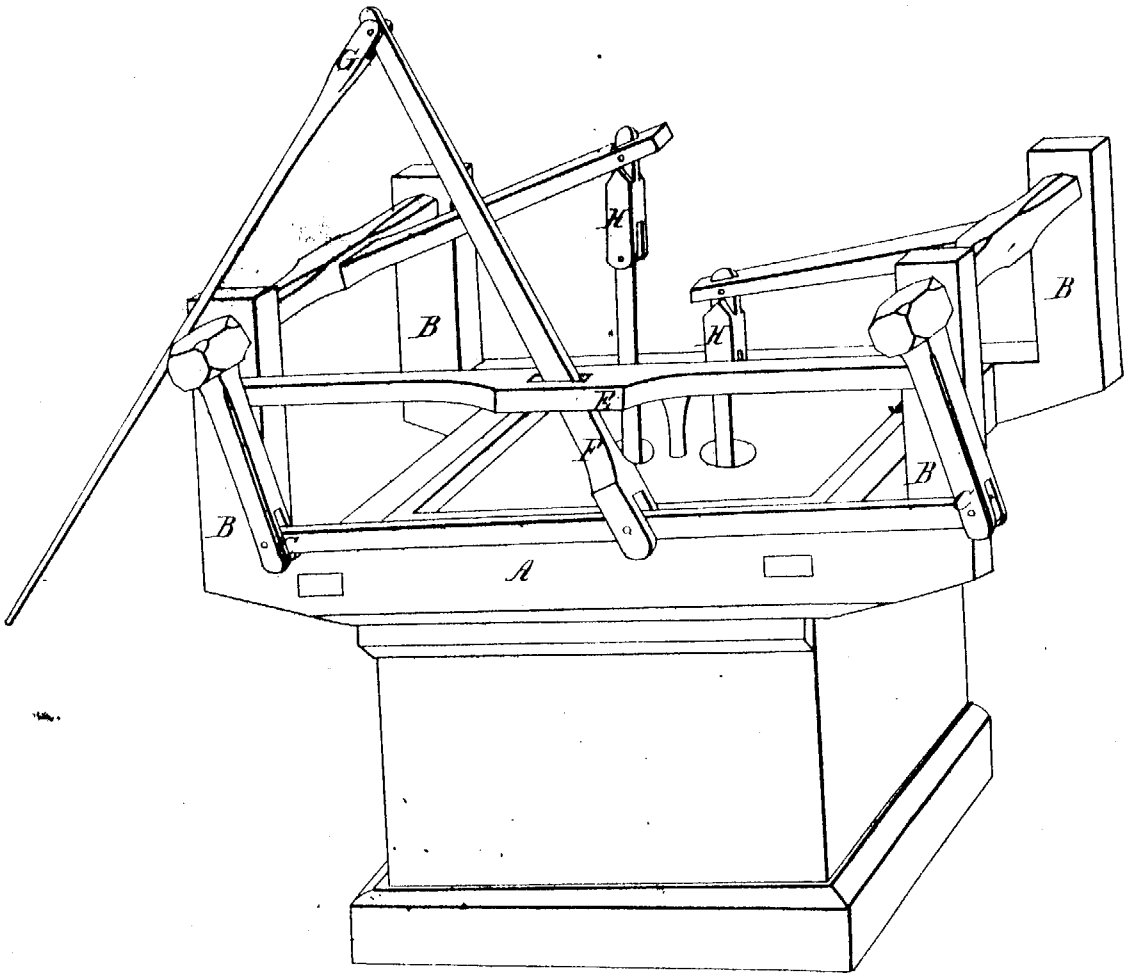

Joseph Turner Poland Maine

Letters Patent

The Schedule referred to in these Letters Patent and making part of
the same containing a description in the words of the said Joseph Turner
himself of his improvement in a machine for Churning butter. —

Know all men by these presents. Be it known that I Joseph Turner
of Poland in the County of Cumberland and State of Maine have
invented a new and useful improvement in a Machine for Churning
butter from Milk & Cream. & that the following is a full and exact descrip
=tion of the Construction and operation ~~and operation~~ of ~~the~~ said Ma
=chine as invented and improved by me. The Machine is Construc
=ted of hard wood in the following Manner. Two pieces of wood two
feet & eight inches long and from one to one and a half inches in thick
=ness and from three to three and a half inches in depth and grad
=uated towards the ends from one to one and a half inches as will ap
=pear by that part of the annexed drawing marked A forms the
two sides of the foundation of the Machine Two cross pieces of the same
dimension of the side pieces above described fourteen inches long
are inserted by means of a Mortise and tenon each at an equal
distance from the ends of the side pieces and at such a distance from each
other as may be convenient. On each extremity of the side pieces there
are inserted by means of a tenon and Mortise two posts one foot
high exclusive of tenon and from one to one and a half inch in
thickness and from two to two and a half inches in width as by
letter (B) will appear. Two shafts from eighteen to twenty inches
in length and from one and a half to two inches square are inser
=ted in the top of the before described posts so as to revolve on
gudgeons from an inch to an inch and a half in diameter. These
shafts project beyond the posts on one side four inches and are let
into their places in the posts by means of a Mortise and secured by a follower & key. On the projecting ends of the shafts there are in
-serted by means of a tenon and mortise two arms eight inches
long exclusive of mortise one inch and a half square. These arms
when the machine is not in motion fall parallel with that of the end
posts. In the ends of each of these are mortises three fourths of an
inch in width into which there is inserted a bar of the same
thickness of the mortise & an inch and a half wide connecting
the two arms and forms a joint. A wood or iron pin fastens the end
of the bar to the extremity of the arms as will appear by the letter C
Another bar exactly over the one described is immovably fixed to
the two posts parallel with the other when the machine is station
-ary, through which there is a mortise two inches wide & six
long as by letter (E). A lever from three to four feet long and two
inches square is then connected with the moveable bar by means of
mortise in said lever fastened by a wood or iron pin so as form a joint
and being inserted through the immovable bar is there fastened
by a wood or iron pin also. This last forms the fulcrum as will be
seen at letter (F). A handle from four to six feet long is attached by
means of a joint to the upper end of the lever as per letter (G). In the
shafts half way between the posts are inserted two long arms exten
-ded inward horizontally so as nearly to meet. These arms are
two inches square and near the ends are inserted by means of a
mortise in the same two connectors or links the upper part of which
is formed by a tenon and the lower part by a mortise. These are con
-nected to the arms by means of a pin and forms a joint and are
about four inches in length including the tenon and mortise as
will appear by the letter (H) To the lower part of this link or connec
-tor is attached the staff of the churn dash or pump rod which
are alike. The churn to which the above machinery is applied
is constructed as follows. A box one foot square and from eighteen
inches to two feet in height constitutes the churn. This is made
of pine plank or board one inch and a quarter thick halved
together at the corners. This stands on a plank bottom projecting two inches in all directions two inches thick. The dashes of the Churn are
formed of one half of two pieces of wood ten inches in length put together
in the form of a cross and called when finished half dashes From
each end of these half dashes there projects tenons three fourths of an
inch square which run in two grooves in each side of the Churn
three eighths of an inch deep. The churn is covered by a follower and
set into the sides three eighths of an inch and through it there are
made holes sufficiently large for the staffs of the dashes to pass in their
movements up and down. The length of the dash depends upon
the size of the Churn. The machine is placed upon the Churn and
the space in the clear between the side pieces and the cross pieces is
calculated to be just the size of the Churn and is supported by
means of cleats on each side of the churn This machine may
be fastened to the Churn by means of hasps if it is found necessary
The whole is put in motion by vibrating the lever by means of the handle
I claim as my invention the formation of the dashes and the man
-ner of their running in grooves, and also the lever power as now applied to the
above described machine, and also the links connecting the arms with
the staffs of the dashes which admits the dashes to play in the grooves
and further the double lever power by means of the immovable bar —

Witnesses
Solomon Sargent
F Bradford

Ralph Turner —

E. d.
Ch. H.

975 no.

(Drawing)